United States Patent
Fries

Patent Number: 6,126,244
Date of Patent: Oct. 3, 2000

[54] PRESSURE CONTROL DEVICE FOR ELECTROPNEUMATIC BRAKE SYSTEMS OF VEHICLES, PARTICULARLY UTILITY VEHICLES

[75] Inventor: Ansgar Fries, München, Germany

[73] Assignee: Knorr-Bremse System für Nutzfahzeuge GmbH, Munich, Germany

[21] Appl. No.: 08/979,944

[22] Filed: Nov. 26, 1997

[30] Foreign Application Priority Data

Nov. 28, 1996 [DE] Germany ............ 196 49 402

[51] Int. Cl.⁷ .................................................. B60T 13/74
[52] U.S. Cl. ........................... 303/3; 303/20; 303/15; 251/129.08; 251/122
[58] Field of Search ............................. 251/121, 122, 251/205, 129.08; 303/119.2, 119.3, 3, 15, 7, 20

[56] References Cited

U.S. PATENT DOCUMENTS

| | | | |
|---|---|---|---|
| 4,445,532 | 5/1984 | Mitchell | 251/122 |
| 4,721,284 | 1/1988 | Bankard | 251/122 |
| 5,065,789 | 11/1991 | Eslinger | 251/122 |
| 5,170,945 | 12/1992 | Daly et al. | 251/205 |
| 5,232,195 | 8/1993 | Torrielli | 251/129.08 |
| 5,544,855 | 8/1996 | Henken et al. | 251/205 |
| 5,560,688 | 10/1996 | Schappler et al. | 303/3 |
| 5,605,172 | 2/1997 | Schubert et al. | 251/122 |
| 5,687,949 | 11/1997 | Dukas et al. | 251/122 |
| 5,782,541 | 7/1998 | Schappler | 303/3 |
| 5,875,817 | 3/1999 | Carter | 251/129.08 |

FOREIGN PATENT DOCUMENTS

| | | |
|---|---|---|
| 3413759A1 | 10/1985 | Germany. |
| 4005608A1 | 9/1991 | Germany. |
| 4103694A1 | 4/1992 | Germany. |
| 4127578A1 | 2/1993 | Germany. |
| 4331966A1 | 3/1995 | Germany. |
| 2270130 | 3/1994 | United Kingdom. |

*Primary Examiner*—Robert J. Oberleitner
*Assistant Examiner*—Robert A. Siconolfi
*Attorney, Agent, or Firm*—Evenson, McKeown, Edwards & Lenahan, P.L.L.C.

[57] ABSTRACT

In the case of a pressure control device for electropneumatic brake systems of vehicles, particularly utility vehicles, an electromagnetically operable intake valve is provided between a compressed air supply and a consuming device of the brake system. The pressure of the consuming device in the form of a brake cylinder is measured by a pressure sensor and transmitted for the controlled actuating of the intake valve to an electronic control unit. The intake valve is constructed as a valve piston which acts with respect to a valve seat and which, on its approach flow end situated upstream of the valve seat, acts such by means of an intake cross-section which can be changed as a function of the piston stroke, with respect to the housing receiving the valve piston. Thus, according to the values determined by the pressure sensor, a controlled feeding of compressed air is permitted corresponding to the selected contouring. The exhaust valve of the pressure control device, which exists between the consuming device and the outside air, can be contoured in a similar manner so that the piston stroke can have a cross-section-variable effect with respect to the housing.

33 Claims, 4 Drawing Sheets

PRESSURE CONTROL DEVICE FOR ELECTROPNEUMATIC BRAKE SYSTEMS OF VEHICLES, PARTICULARLY UTILITY VEHICLES

BACKGROUND AND SUMMARY OF THE INVENTION

This application claims the priority of German application 196 49 402.8 filed in Germany on Nov. 28, 1996, the disclosure of which is expressly incorporated by reference herein.

The invention relates to a pressure control system of vehicles having intake and exhaust valves actuated by solenoids for the controlled venting and bleeding of the brake system consuming devices.

In electropneumatic brake systems, actuators of many different types are used for controlling the brake pressure. The actuators in these systems must carry out the service brake function as well as the ABS-function. In this case, it is necessary to permit slow smooth pressure changes for the service brake function as well as rapid pressure changes for the emergency brake or the ABS function. Either valves are used which can carry out both functions, or different valves are used separately for each function. Among others, proportional solenoid valves with and without a relay valve, with and without ABS pressure control valves; also double solenoid valves for the pilot control of a relay valve, with and without ABS pressure control valves are used as well as current-controlled pilot control solenoid valves with seat valves, the latter for both functions.

In an attempt to develop smooth adjustments of the consuming device pressure, pressure control devices have been developed in the case of which, while the consuming device pressure is monitored on the consuming device side by a pressure sensor, intake and exhaust valves are provided which interact with pilot valves in such a manner that, in the course of the electric drive of solenoid valves actuating the intake and exhaust valves, in a manner which is limited with respect to time, a throttled opening of the pilot control valves is permitted. As the excitation of the actuating magnets increases, the pilot control valves are shut and the actual main valves are opened up over a large cross-section. In the case of these types of control devices, the desired smooth feeding of the consuming device pressure is determined by a plurality of parameters. In addition, intermediate and floating positions of the main valves exist which must be defined as a function of the exciting current. The constructional expenditures of such pressure control deices are therefore considerable. In addition, functional precision is required under different temperature and pressure conditions.

Based on the above, it is an object of the invention to further develop a pressure control device of the above-mentioned type by simple means in such a manner that it can carry out service brake functions as well as ABS functions and, in particular, it is suitable for providing smooth pressure changes during service braking as well as rapid pressure changes when required by emergency braking or ABS functions. As the result of the structure of such pressure control devices, the use of pilot control units should also not be necessary.

This object is achieved according to preferred embodiments of the invention by providing a pressure control device for electropneumatic brake systems of the type referred to above, wherein the intake valve connected between a compressed air supply and a consuming device and/or an exhaust valve connected between the consuming device and a pressure relief (atmosphere) is provided with an intake cross-section or exhaust cross-section which can be changed by way of the piston stroke of its valve piston, and wherein a pressure medium chamber of a pressure control device, which is fed by the intake valve and is connected with the consuming device, is continuously monitored by a pressure sensor with respect to the controlled-in pressure or the pressure to be reduced, which pressure sensor transmits the determined pressure values to an electronic control unit for actuating the solenoid of the intake valve or exhaust valve.

Because of the sensor-dependent drive of the solenoids of the intake valve and the exhaust valve and because of the precisely defined contouring of the valve pistons of the intake valve and the exhaust valve at their approach-flow-side end, it is possible as a function of the stroke to achieve any targeted pressure change and volume change for the consuming device. That is, because of the stroke-dependent change of the available cross-section between the intake end of the valve piston and the inside cross-section of the housing directly receiving the valve piston, it is possible to adapt the course of the pressure to the respective braking situation. The air flow can therefore be proportioned in a targeted manner by way of a flow cross-section which can be changed by way of the piston stroke of the intake valve and/or the exhaust valve. As a result, it becomes possible that:

(i) during an emergency braking, the whole cross-section and therefore a rapid pressure rise can be obtained;

(ii) in the case of an ABS-control, the large cross-sections can also be used;

(iii) in the case of smooth braking operations and slow changes, small flow cross-sections and therefore slow pressure changes are permitted;

(iv) the dynamic course of the braking signal, for example, a rapid pressure rise to approximately 90% of the brake pressure and then a slower pressure rise, can be implemented merely by the change of the flow cross-section; and (v) the so-called wheel module of the brake system learns the pressure gradient for the venting and bleeding because the volumes connected behind consisting of the brake hose and the brake cylinder remain constant after the installation so that, corresponding to the level and mainly the time dependency of the braking signal, an optimal controlling is permitted.

As far as the constructional criteria of such a pressure control device are concerned, important advantages can also be achieved; that is, the service brake function as well as the ABS function can be implemented by means of one module. Furthermore, the air consumption is that of the present brake systems; that is, there is no increased air consumption as a result of timing valves. Also, no noises have to be accepted, as they disadvantageously occur in the case of timed valves or pulsating valves. It is also an advantage that the device operates essentially independently of the temperature because of its current control.

Other objects, advantages and novel features of the present invention will become apparent from the following detailed description of the invention when considered in conjunction with the accompanying drawings.

DETAILED DESCRIPTION OF THE DRAWINGS

Figure 1:
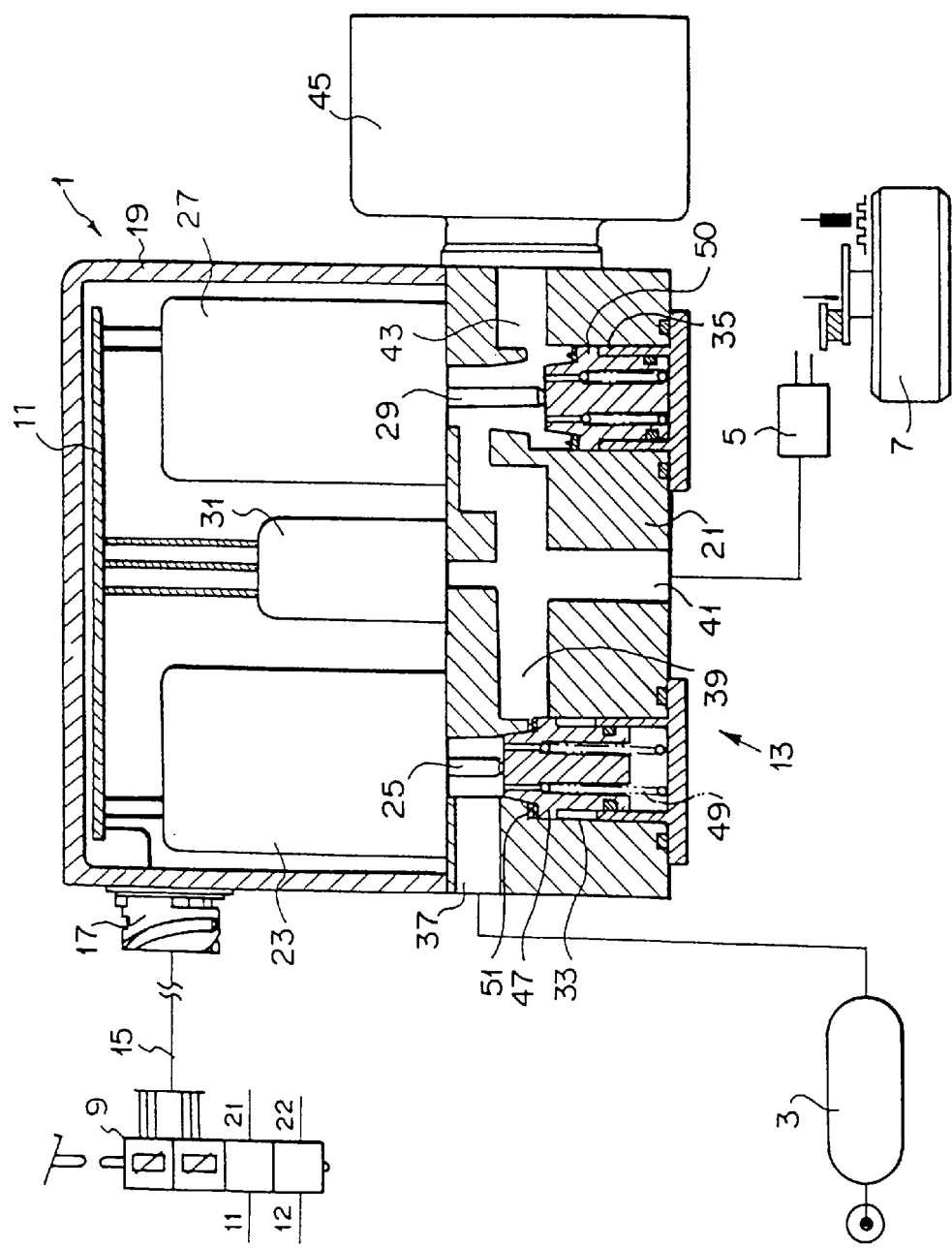
FIG. 1 is a schematic view of a pressure control device constructed according to a preferred embodiment of the present invention.

FIG. 1 of the drawing shows a first embodiment of an electropneumatic brake system using the pressure control device 1 according to the invention. As illustrated, the pressure control device 1 is connected to a compressed air supply 3, a brake cylinder 5 for a schematically illustrated wheel 7 of the vehicle and an electromagnetic brake value generator 9 in the form of a foot brake valve. The pressure control device 1 consists of two functional units, a schematically illustrated electronic control unit 11 and a valve device 13 which, in the manner explained below, are controlled by means of the electronic control unit in order to control the connection between the pressure medium source, thus the compressed air supply 3, and the consuming device, that is, the brake cylinder, as well as the connection between the brake cylinder 5 and the pressure relief, that is, in the illustrated embodiment, with the outside air.

By means of its electric part, the electropneumatic brake value generator 9 is connected by way of a control line 15 and a plug 17 with the electronic control unit 11. The electronic control unit 11 is situated inside a housing 19 which is connected with the housing 21 of the valve device 13 situated below it in the drawing. In the housing 19 of the electronic control unit, a solenoid 23 and an actuating tappet 25 formed by its armature, another solenoid 27 with an actuating tappet 29 and a pressure sensor 31 connected to the electronic control unit 11 are situated. The two solenoids 23 and 27 are also connected with the electronic control unit 11 and are controlled according to the actuating of the braking value generator 9 and of the measurable variables entering the electronic control unit 11 and converted by the pressure sensor. In housing 21 situated below housing 19, the valve device 13 is provided with an intake valve 33 and an exhaust valve 35. The intake valve monitors the connection between an intake 37 and a pressure medium chamber 39 which is connected by way of an exhaust 41 to the consuming device, that is, to the brake cylinder 5. The exhaust valve 35 monitors the connection between the consuming device 5 and another exhaust 43 which is connected to the atmosphere and therefore forms the actual relief device. In the illustrated embodiment, the exhaust 43 is connected with the outside air by means of a sound absorber 45. In the illustration according to FIG. 1, the two valves are illustrated in their starting position; that is, the intake valve 33 blocks the connection between the compressed air supply 3 and the consuming device, while the exhaust valve opens up the connection in the bleeding direction; that is, the brakes of the vehicle are bled. The two solenoids are without current, the moved-in position of the actuating tappet 25 and the moved-out position of the actuating tappet 29 being caused, for example, by the effect of a spring.

The intake valve 33 is provided with a valve piston 47 which can be operated against the force of a spring 49 and, in a conventional manner, has devices for the pressure relief; that is, in the illustrated embodiment, bores which extend through the valve piston in such a manner that a pressure relief exists at both faces of the valve piston.

Figures 2A, 2B, 2C:
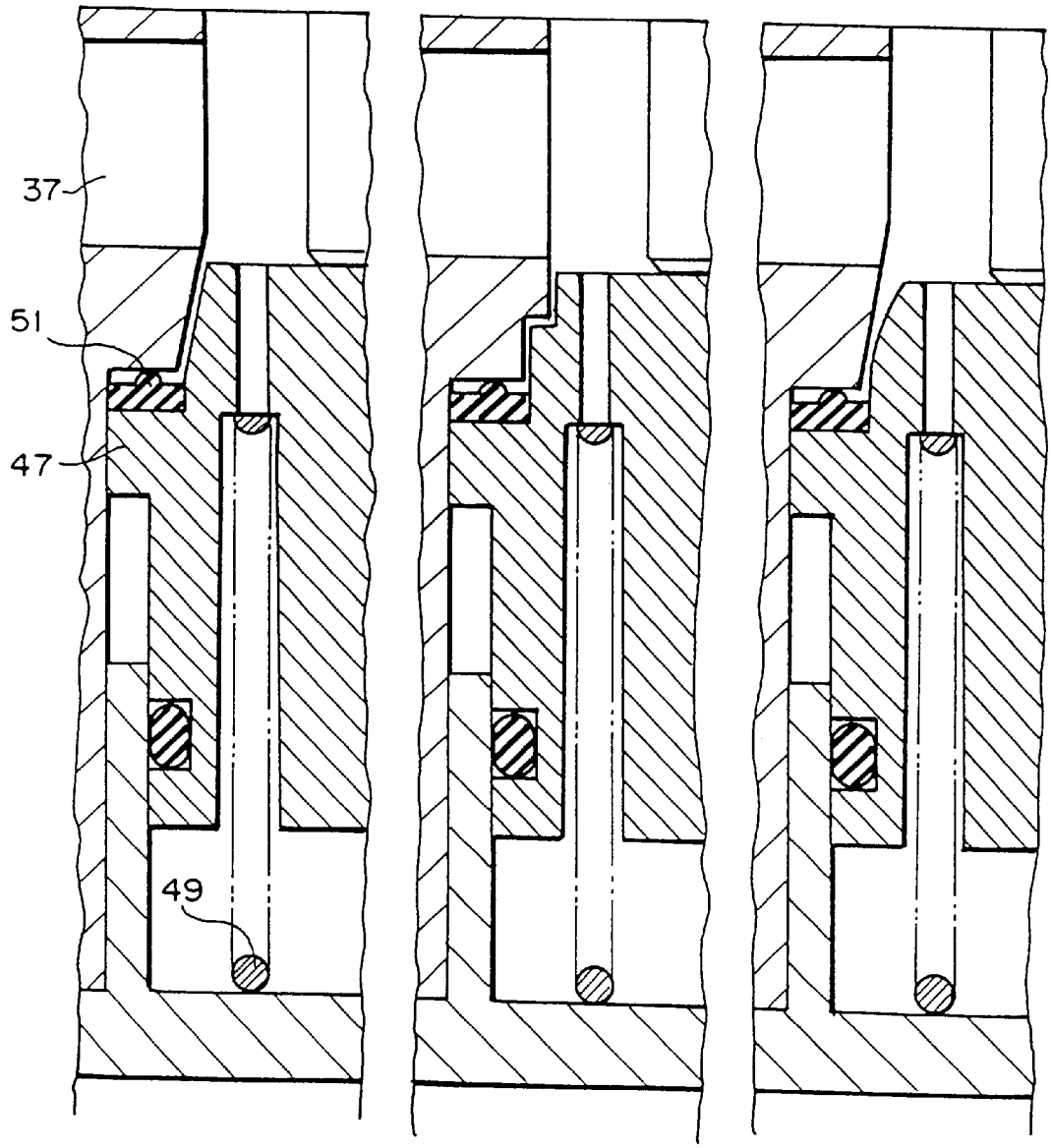
FIG. 2 indicates enlarged sectional views of three different contours formed between the intake end of the valve piston and the inside cross-section of the housing receiving the valve end, according to preferred embodiments of the present invention.

According to the invention, the valve piston 47 is provided in its direct intake area, that is, at its end facing the supply pressure, with a special contour design which permits a targeted metering of the air flow by means of a flow cross-section which can be changed above the piston stroke. A contouring at the intake cross-section of the valve housing is adapted to the special shaping at the intake end of the valve piston 47 which permits the above-mentioned targeted metering of air according to the stroke. FIG. 2 of the drawing illustrates different con tours at the intake en d of the valve piston 47 in an assignment to the especially designed contouring of the valve housing.

Figure 3:
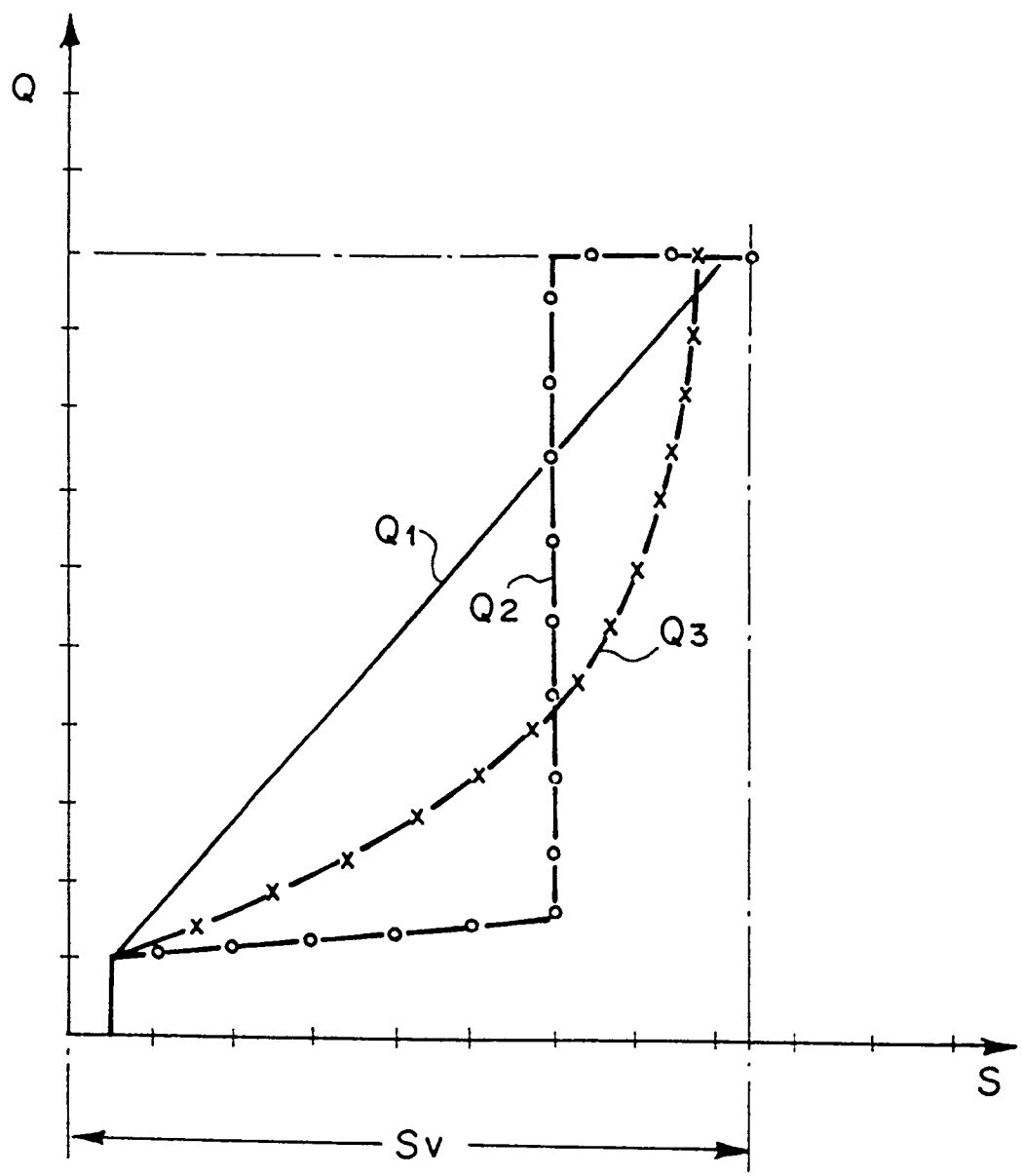
FIG. 3 is a graph of the flow cross-sections Q1–Q3 which can be achieved by means of the contours A, B and C according to FIG. 2 with respect to the stroke S, Sr representing the control range of the available stroke.

FIG. 3 illustrates the flow cross-sections permitted because of the contours illustrated in FIG. 2 as a function of the stroke of the valve piston which can be displaced by the actuating tappet 25. The flow cross-sections Q1, Q2 and Q3 according to FIG. 3 are assigned to the contours A, B and C according to FIG. 2. It is recognizable that contour A results in a linearly extending change of the flow cross-sections, while contour B, depending on the stroke, causes a complete opening of the cross-section after a preceding linear cross-sectional enlargement. In the case of contour C, the profile between the valve piston 47 and the valve housing is of a different type. This means that the curved course of the flow cross-section, which is illustrated in FIG. 3 and which is formed between the valve housing and the intake end of the valve piston corresponds to the curved course at the intake end of the valve tappet.

The above explanations concerning the cross-sectional changes on the valve piston 47 of the intake valve 33 apply in the same manner to the contouring and the resulting cross-sectional changes at the valve piston 50 of the exhaust valve 35.

The actuating of the exhaust valve by the solenoid 27 can also take place according to the determined pressure values and a contour according to FIG. 2 indicating the opening cross-section; that is, a smooth as well as a large-volume rapid bleeding of the consuming device can take place in the same manner.

The method of operation of the above-explained pressure control device is as follows: During a braking, a desired braking signal given by the braking value generator 9 is supplied by way of the plug 17 to the electronic control unit 11. By way of the solenoid 27 and its actuating tappet 29, the electronic control unit closes the exhaust valve 35 (FIG. 1) and activates the solenoid 23 by way of the intake valve 33. When the magnetic force of the solenoid 23 exceeds the spring force of the spring 49 and the frictional forces existing at the valve piston, the valve piston starts to move and opens up the valve seat 51 existing opposite the housing so that the supply air of the compressed air supply 3 arrives in the pressure medium chamber 39 through the intake 37 and the opened intake valve and, from the pressure medium chamber 39, reaches the consuming device. Simultaneously, the pressure building up in the pressure medium chamber 39 is continuously measured by the pressure sensor 31 which leads this pressure value to the installed electronic control unit 11. The electronic control unit compares the given braking signal with the actual value of the brake pressure and controls the intake valve 33 until this valve closes again. The brake pressure will now remain constant since the exhaust valve 35 is in a closed position. If the brake pressure is to be reduced, this takes place analogously by way of the exhaust valve 35 and the exhaust 43 which leads to the atmosphere. By means of the above-explained cross-section-variable characteristic of the intake valve, large cross-sections are permitted in the case of a fast pressure rise, as required, for example, for emergency braking, but also small flow cross-sections and therefore slow pressure changes, as required in the case of smooth braking operations. A dynamic course of the braking signal can therefore be achieved merely by changing the flow cross-section; for example, a fast pressure rise to approximately 90% of the achievable brake pressure, and subsequently a slow pressure rise.

Figure 4:
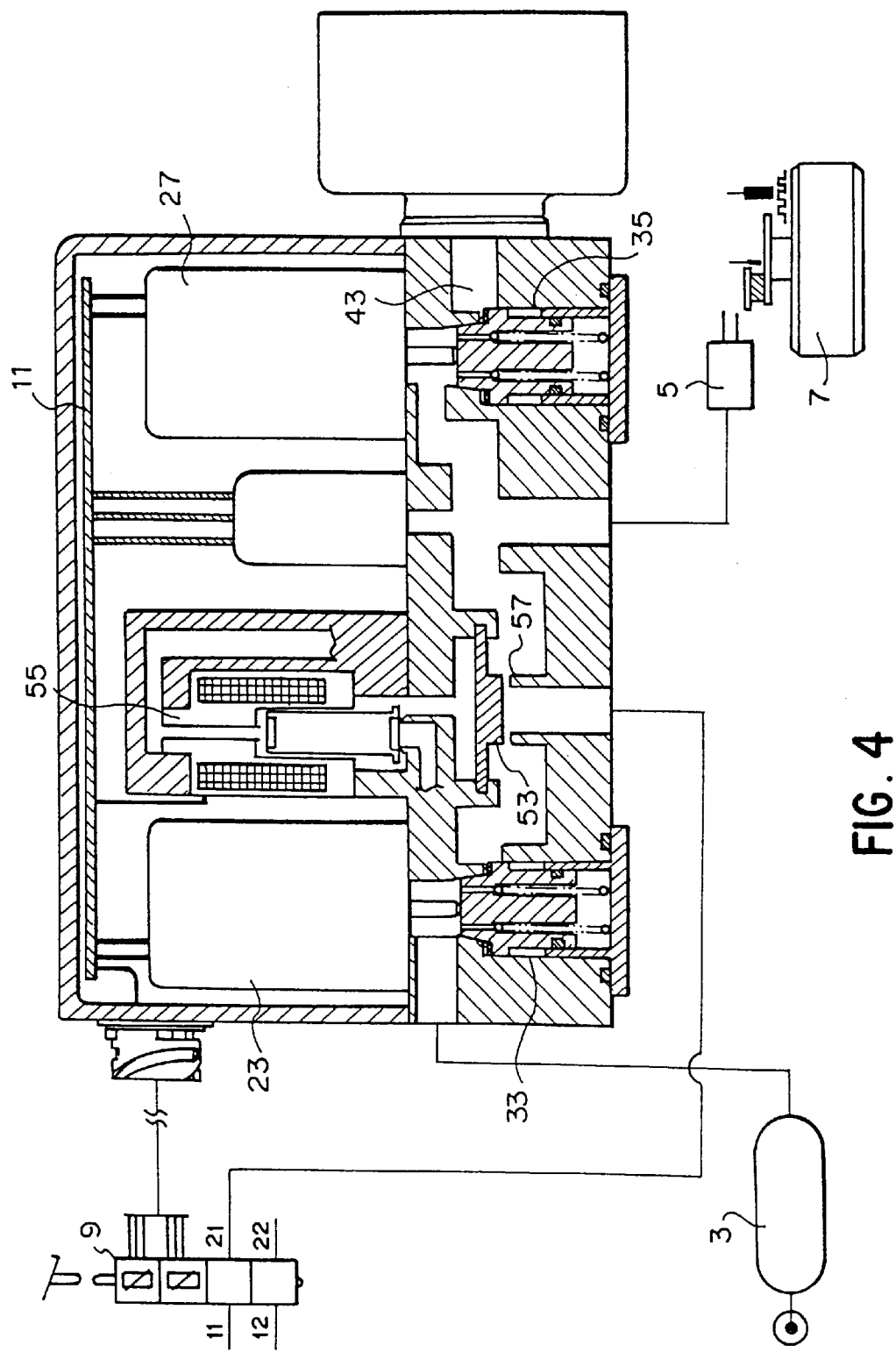
FIG. 4 is a schematic view similar to FIG. 1 and showing a pressure control device according to another embodiment of the invention, with the use of a pneumatically redundant system.

FIG. 4 illustrates a pressure control device according to another embodiment of the invention. In this case, the pressure control device is provided with an additional brake pressure retaining valve 53. This retaining valve 53 interacts with an intake and exhaust valve 55 to which the compressed air supply is connected. In the case of an electric drive by way of the braking value generator 9 and the actuating of the intake valve 33, the intake and exhaust valve 55 is opened up simultaneously such that, as the result of the supply pressure existing in front of the compressed air supply 3, the brake pressure retaining valve 53 is held in the closed position on the housing-side valve seat 57. When the intake valve 33 is opened up, pressure is admitted to the consuming device, that is, the brake cylinder 5, in the manner explained with respect to FIG. 1. For the pressure reduction while the intake valve is shut, the exhaust valve 35 is actuated by means of the solenoid 27; that is, its valve piston is displaced into the opened position pointing downward (FIG. 4), such that the connection exists between the consuming device and the relief device. In the case of a disconnection or in the case of a failure of the control by means of the control unit 11 and the actuating of the braking value generator 9, the brake pressure originating from its pneumatic generator part is controlled through in the direction of the consuming device while the brake pressure retaining valve 53 opens up; specifically at the ratio 1:1. In this case, the brake pressure retaining valve 53 takes up the opened position since the pressure which is present by way of the intake and exhaust valve 55 from the compressed air supply 3 is blocked off when the electropneumatic control circuit is switched off, and the brake pressure retaining valve is bled by way of the opened intake and exhaust valve 55 according to the illustration of FIG. 4. In the embodiment according to FIG. 4, it is ensured by means of the brake pressure retaining valve and the pneumatic part of the braking value generator 9 in the form of the foot brake valve that a brake pressure cannot be built up during the driving. This means that, in the driving condition of the vehicle, the bleeding of the consuming device is always ensured by way of the pneumatic generator part of the braking value generator or its bleeding connection. For this reason, in contrast to the embodiment of FIG. 1, the intake valve 33 and the exhaust valve 35 may have an identical construction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electropneumatic brake system comprising:
   a compressed air supply,
   a brake cylinder,
   a pressure relief zone,
   a movable intake valve including a solenoid operable to control air pressure from the compressed air supply to the brake cylinder, said intake valve having a cross-section which varies as a function of a position of its solenoid,
   a movable exhaust valve including a solenoid operable to control air exhaust from the brake cylinder to the pressure relief zone, said exhaust valve having a cross-section which varies as a function of a position of its solenoid,
   a pressure sensor which continuously monitors pressure acting on the brake cylinder,
   and an electronic control unit operable to control said solenoids as a function of pressure sensed by the pressure sensor to thereby accommodate both normal braking operation and emergency or ABS braking operation by utilizing the variable valve cross-sections controlled by positions of the solenoids,
   wherein at least one of said valves is provided with a valve piston cooperating with a valve seat of a valve housing, said valve piston and valve seat having contoured surfaces which extend axially and radially of an axial travel path of said piston to thereby provide a variable flow cross-section for air as a function of respective relative axial positions of said valve piston and valve seat, and
   wherein said contoured surfaces are respective stepped surfaces which are operable to provide a stepped change in said variable flow cross-section as a function of respective relative axial positions of said valve piston and valve seat.

2. A system according to claim 1, wherein said at least one of said valves includes said intake valve.

3. A system according to claim 1, wherein said at least one of said valves includes said exhaust valve.

4. A system according to claim 1, wherein said at least one of said valves includes both the intake valve and the exhaust valve.

5. A system according to claim 4, wherein both of the intake and exhaust valves have similar contoured surfaces.

6. A system according to claim 4, wherein said valve piston includes an annular valve piston seat portion which surrounds the contoured surfaces of said valve piston,
   wherein said valve housing includes an annular housing seat portion which surrounds the contoured surfaces of said valve seat, and
   wherein said annular valve piston and housing seat portions abut one another in a closed position of the valve.

7. A system according to claim 1, wherein said valve piston includes an annular valve piston seat portion which surrounds the contoured surfaces of said valve piston,
   wherein said valve housing includes an annular housing seat portion which surrounds the contoured surfaces of said valve seat, and
   wherein said annular valve piston and housing seat portions abut one another in a closed position of the valve.

8. A system according to claim 1, comprising a brake pressure retaining valve which is held in a blocking position in the case of an electric drive of the solenoid of the intake and exhaust valves, the brake pressure retaining valve being connected to a pneumatic control part of a braking value generator,
   wherein the brake pressure retaining valve is situated in a connection between the braking value generator and the brake cylinder such that, in the event of a failure of the electric control and the actuating of the braking value generator, a pneumatic controlling through takes place from the pneumatic control part of the braking value generated to the brake cylinder.

9. A system according to claim 8, wherein exhausting of the brake cylinder takes place while the brake pressure retaining valve is opened by way of a pneumatic control part of the braking value generator or its pressure relief.

10. An electropneumatic brake system comprising:

a compressed air supply, a brake cylinder, a pressure relief zone, a movable intake valve including a solenoid operable to control air pressure from the compressed air supply to the brake cylinder, said intake valve having a cross-section which varies as a function of a position of its solenoid, a movable exhaust valve including a solenoid operable to control air exhaust from the brake cylinder to the pressure relief zone, said exhaust valve having a cross-section which varies as a function of a position of its solenoid, a pressure sensor which continuously monitors pressure acting on the brake cylinder, and an electronic control unit operable to control said solenoids as a function of pressure sensed by the pressure sensor to thereby accommodate both normal braking operation and emergency or ABS braking operation by utilizing the variable valve cross-sections controlled by positions of the solenoids, wherein at least one of said valves is provided with a valve piston cooperating with a valve seat of a valve housing, said valve piston and valve seat having contoured surfaces which extend axially and radially of an axial travel path of said piston to thereby provide a variable flow cross-section for air as a function of respective relative axial positions of said valve piston and valve seat, wherein said at least one of said valves includes both the intake valve and the exhaust valve, and wherein said intake and exhaust valves have respective different contoured surfaces to provide different variable flow cross-section changes as a function of respective relative axial positions of said valve piston and valve seat.

11. A system according to claim 10, wherein said contoured surfaces are respective conical surfaces which are operable to provide linear change in said variable flow cross-section as a function of respective relative axial positions of said valve piston and valve seat.

12. A system according to claim 11, comprising a brake pressure retaining valve which is held in a blocking position in the case of an electric drive of the solenoid of the intake and exhaust valves, the brake pressure retaining valve being connected to a pneumatic control part of a braking value generator, wherein the brake pressure retaining valve is situated in a connection between the braking value generator and the brake cylinder such that, in the event of a failure of the electric control and the actuating of the braking value generator, a pneumatic controlling through takes place from the pneumatic control part of the braking value generated to the brake cylinder.

13. A system according to claim 12, wherein exhausting of the brake cylinder takes place while the brake pressure retaining valve is opened by way of a pneumatic control part of the braking value generator or its pressure relief.

14. A system according to claim 10, wherein said contoured surfaces are respective stepped surfaces which are operable to provide a stepped change in said variable flow cross-section as a function of respective relative axial positions of said valve piston and valve seat.

15. A system according to claim 14, comprising a brake pressure retaining valve which is held in a blocking position in the case of an electric drive of the solenoid of the intake and exhaust valves, the brake pressure retaining valve being connected to a pneumatic control part of a braking value generator, wherein the brake pressure retaining valve is situated in a connection between the braking value generator and the brake cylinder such that, in the event of a failure of the electric control and the actuating of the braking value generator, a pneumatic controlling through takes place from the pneumatic control part of the braking value generated to the brake cylinder.

16. A system according to claim 15, wherein exhausting of the brake cylinder takes place while the brake pressure retaining valve is opened by way of a pneumatic control part of the braking value generator or its pressure relief.

17. A system according to claim 10, wherein said contoured surfaces are respective curved surfaces which are operable to provide a non-linear change in flow cross-section as a function of relative axial positions of said valve piston and valve seat.

18. A system according to claim 17, comprising a brake pressure retaining valve which is held in a blocking position in the case of an electric drive of the solenoid of the intake and exhaust valves, the brake pressure retaining valve being connected to a pneumatic control part of a braking value generator, wherein the brake pressure retaining valve is situated in a connection between the braking value generator and the brake cylinder such that, in the event of a failure of the electric control and the actuating of the braking value generator, a pneumatic controlling through takes place from the pneumatic control part of the braking value generated to the brake cylinder.

19. A system according to claim 18, wherein exhausting of the brake cylinder takes place while the brake pressure retaining valve is opened by way of a pneumatic control part of the braking value generator or its pressure relief.

20. A system according to claim 10, comprising a brake pressure retaining valve which is held in a blocking position in the case of an electric drive of the solenoid of the intake and exhaust valves, the brake pressure retaining valve being connected to a pneumatic control part of a braking value generator, wherein the brake pressure retaining valve is situated in a connection between the braking value generator and the brake cylinder such that, in the event of a failure of the electric control and the actuating of the braking value generator, a pneumatic controlling through takes place from the pneumatic control part of the braking value generated to the brake cylinder.

21. A system according to claim 20, wherein exhausting of the brake cylinder takes place while the brake pressure retaining valve is opened by way of a pneumatic control part of the braking value generator or its pressure relief.

22. An electropneumatic brake system comprising:

a compressed air supply, a brake cylinder, a pressure relief zone, a movable intake valve including a solenoid operable to control air pressure from the compressed air supply to the brake cylinder, said intake valve having a cross-section which varies as a function of a position of its solenoid, a movable exhaust valve including a solenoid operable to control air exhaust from the brake cylinder to the pressure relief zone, said exhaust valve having a cross-section which varies as a function of a position of its solenoid, a pressure sensor which continuously monitors pressure acting on the brake cylinder, and an electronic control unit operable to control said solenoids as a function of pressure sensed by the pressure sensor to thereby accommodate both normal braking operation and emergency or ABS braking operation by utilizing the variable valve cross-sections controlled by positions of the solenoids, wherein at least one of said valves is provided with a valve piston cooperating with a valve seat of a valve housing, said valve piston and valve seat having contoured surfaces which extend axially and radially of an axial travel path of said piston to thereby provide a variable flow cross-section for air as a function of respective relative axial positions of said valve piston and valve seat, wherein said contoured surfaces are respective curved surfaces which are operable to provide a non-linear change in flow cross-section as a function of relative axial positions of said valve piston and valve seat.

23. A system according to claim 22, wherein said at least one of said valves includes said intake valve.

24. A system according to claim 22, wherein said at least one of said valves includes said exhaust valve.

25. A system according to claim 22, wherein said at least one of said valves includes both the intake valve and the exhaust valve.

26. A system according to claim 25, wherein both of the intake and exhaust valves have similar contoured surfaces.

27. A system according to claim 26, comprising a brake pressure retaining valve which is held in a blocking position in the case of an electric drive of the solenoid of the intake and exhaust valves, the brake pressure retaining valve being connected to a pneumatic control part of a braking value generator, wherein the brake pressure retaining valve is situated in a connection between the braking value generator and the brake cylinder such that, in the event of a failure of the electric control and the actuating of the braking value generator, a pneumatic controlling through takes place from the pneumatic control part of the braking value generated to the brake cylinder.

28. A system according to claim 27, wherein exhausting of the brake cylinder takes place while the brake pressure retaining valve is opened by way of a pneumatic control part of the braking value generator or its pressure relief.

29. A system according to claim 25, comprising a brake pressure retaining valve which is held in a blocking position in the case of an electric drive of the solenoid of the intake and exhaust valves, the brake pressure retaining valve being connected to a pneumatic control part of a braking value generator, wherein the brake pressure retaining valve is situated in a connection between the braking value generator and the brake cylinder such that, in the event of a failure of the electric control and the actuating of the braking value generator, a pneumatic controlling through takes place from the pneumatic control part of the braking value generated to the brake cylinder.

30. A system according to claim 29, wherein exhausting of the brake cylinder takes place while the brake pressure retaining valve is opened by way of a pneumatic control part of the braking value generator or its pressure relief.

31. A system according to claim 22, wherein said valve piston includes an annular valve piston seat portion which surrounds the contoured surfaces of said valve piston, wherein said valve housing includes an annular housing seat portion which surrounds the contoured surfaces of said valve seat, and wherein said annular valve piston and housing seat portions abut one another in a closed position of the valve.

32. A system according to claim 22, comprising a brake pressure retaining valve which is held in a blocking position in the case of an electric drive of the solenoid of the intake and exhaust valves, the brake pressure retaining valve being connected to a pneumatic control part of a braking value generator, wherein the brake pressure retaining valve is situated in a connection between the braking value generator and the brake cylinder such that, in the event of a failure of the electric control and the actuating of the braking value generator, a pneumatic controlling through takes place from the pneumatic control part of the braking value generated to the brake cylinder.

33. A system according to claim 32, wherein exhausting of the brake cylinder takes place while the brake pressure retaining valve is opened by way of a pneumatic control part of the braking value generator or its pressure relief.

* * * * *